United States Patent [19]

Tanguy

[11] 3,922,542
[45] Nov. 25, 1975

[54] DEVICE FOR THE CONTINUOUS ANALYSIS OF SAMPLES ESPECIALLY BY NON-DISPERSIVE X-RAY FLUORESCENCE

[75] Inventor: Jean-Claude Tanguy, Athis Mons, France

[73] Assignee: Commissariat a l'Energie Atomique, Paris, France

[22] Filed: Jan. 22, 1974

[21] Appl. No.: 435,592

[30] Foreign Application Priority Data
Jan. 30, 1973 France .............................. 73.03211

[52] U.S. Cl. ................ 250/277; 250/278; 250/453; 250/510
[51] Int. Cl. .......................................... G01m 21/00
[58] Field of Search ........... 250/272, 277, 278, 279, 250/453, 510

[56] References Cited
UNITED STATES PATENTS
3,435,220  3/1969  Hanken............................ 250/510
3,641,342  8/1974  Armel et al...................... 250/453

Primary Examiner—James W. Lawrence
Assistant Examiner—B. C. Anderson
Attorney, Agent, or Firm—Cameron, Kerkam, Sutton, Stowell & Stowell

[57] ABSTRACT

The continuous analysis of samples is performed by a device comprising a measuring head constituted by a removable radioactive source and a counting assembly connected to a radiation detector, a sequential filter-transfer unit comprising a conveyor driven in reciprocating motion between a filter stack and a gap between the source and the detector, a sample-transfer unit with inclined parallel slide-ramps and a receiving trough fitted with a push-plate for passing the samples in front of the source in unitary sequence, a mechanical control assembly and an electronic assembly for recording signals delivered by the radiation detector after analysis of each sample.

13 Claims, 5 Drawing Figures

DEVICE FOR THE CONTINUOUS ANALYSIS OF SAMPLES ESPECIALLY BY NON-DISPERSIVE X-RAY FLUORESCENCE

This invention relates to a device for analyzing a series of samples having different characteristics, especially by a method of non-dispersive X-ray fluorescence, with a view to determining the character and concentration of elements contained in each sample under inspection in accordance with a previously defined sequence of operations.

Different types of devices for X-ray fluorescence analysis are already known in which the radiation emitted by a sealed radioactive source is employed as excitation means and impinges upon the sample, thereby initiating the emission of secondary X-radiation from said sample, the concentration of any element in the sample being determined by the intensity of the characteristic X lines of said element in the spectrum. In the case of a non-dispersive measurement which consists in carrying out direct detection of the radiation emitted by the sample, use is made in particular of special filters which make it possible to eliminate certain spectral lines so that only those which are typical of a given element are permitted to remain. By making use of a series of different filters, it is accordingly possible to determine the composition and concentration of the constituents of samples under observation. These conventional devices have an advantage in that they call for the use of sources which are compact, often monoenergetic and of stable intensity, are light in weight, take up little space, can thus be readily transported and finally entail relatively limited capital outlay. On the other hand, such devices suffer from a disadvantage in that they require the continuous presence of an operator who has to carry out the positioning of each sample in front of the source and an emitted-radiation detector and on the other hand the changing-over of filters, thereby entailing risks of damaging these latter as a result of essential handling operations.

The present invention relates to a device for the continuous analysis of samples which circumvents these disadvantages by permitting automatic transfer of said samples in front of a measuring head while at the same time positioning a series of suitable filters within a space of very small thickness which is delimited between a radioactive source and a radiation detector, the sequence of utilization of said filters being identical in the case of each sample, thereby permitting comparative measurement which are accurate and perfectly repetitive.

To this end, the device under consideration which comprises a measuring head consititited by a removable sealed radioactive source and a counting assembly connected to a radiation detector comprising an entrance window which delimits with the source a space of small thickness reserved for the positioning of successive flat filters of identical shape, is characterized in that it comprises:

on the one hand a sequential filter-transfer unit comprising a conveyor driven in reciprocating motion between a first position in which a filter is brought into the spaced formed between the source and the detector and a second position in which the filter aforesaid is integrated in a stack formed by all the filters, on the other hand a sample-transfer unit comprising an inclined transfer rack provided with parallel slide-ramps containing the samples to be analyzed, a trough for receiving groups of samples formed by one sample from each slide-ramp, a push-plate for the group of samples within the trough, the function of said push-plate being to cause said samples to pass in unitary sequence in front of the measuring head above the source and the space for receiving the filters, and a platform for storing samples after analysis, a control assembly for the mechanisms which actuate the filter-transfer unit and the sample-transfer unit and an electronic assembly for recording the signals delivered by the radiation detector after analysis of one sample through each filter.

In accordance with a particular feature of the invention, the filter-transfer unit comprises a tubular shaft located above the conveyor and containing the stack of filters, a filter-receiving well located beneath the conveyor in the axis of the tubular shaft and containing a supporting piston, a first crank arm and pin assembly driven by a first electronic motor for carrying out the displacement of the piston within the well at the end of a cycle of analysis of a sample by all the filters, the upward motion of the piston for returning the stack of filters into the tubular shaft, a second crank arm and pin assembly driven by a second electric motor so as to cause the reciprocating motion of the conveyor, two movable jaws mounted beneath the conveyor which is provided with an opening for receiving each filter in turn, and jaw-separating wedges which are carried by the conveyor and separate said jaws in order to release the filters into the well in unitary sequence after utilization.

In an alternative embodiment, the supporting piston can be driven in a downward movement inside the well with successive amplitudes which each correspond to the thickness of one filter, then in a reverse movement of upward displacement of the stack of filters with an amplitude which is equal to the total downward travel of said piston.

In accordance with another characteristic feature, the sample-transfer unit comprises a mechanism for controlling the displacement of the push-plate unit which comprises a third motor for driving a guide rule attached to the push-plate unit by means of a rack and pinion system, the movement of said rule being such as to correspond to periods of displacement with an amplitude which is equal to the width of one sample separated by stationary periods which correspond to one complete cycle of the filter-transfer unit.

Further properties of an analytical device constructed in accordance with the invention will become apparent from the following description of one example of construction which is given by way of indication without any implied limitation, reference being made to the accompanying drawings, wherein.

Figure 1:
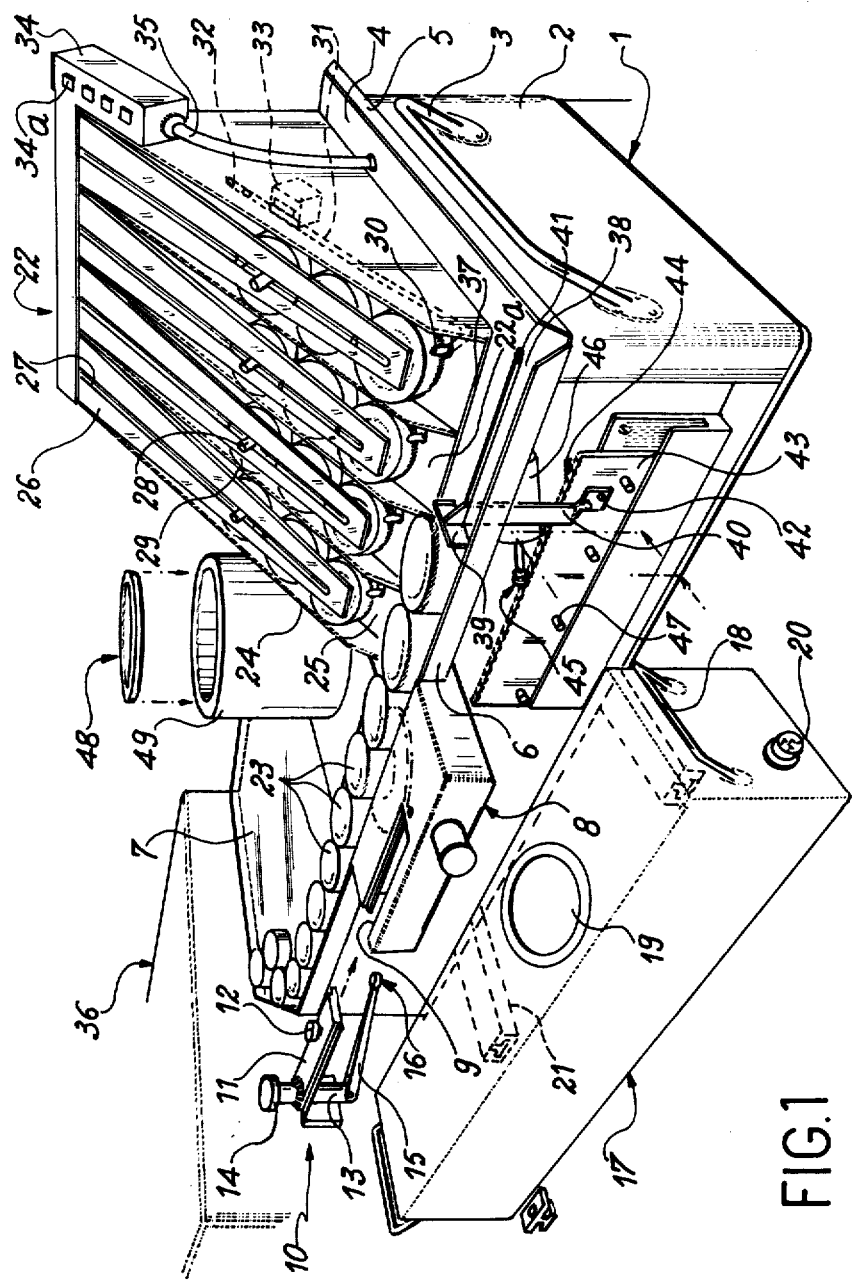
FIG. 1 is a diagrammatic view in perspective showing the complete device under consideration.
Figure 2:
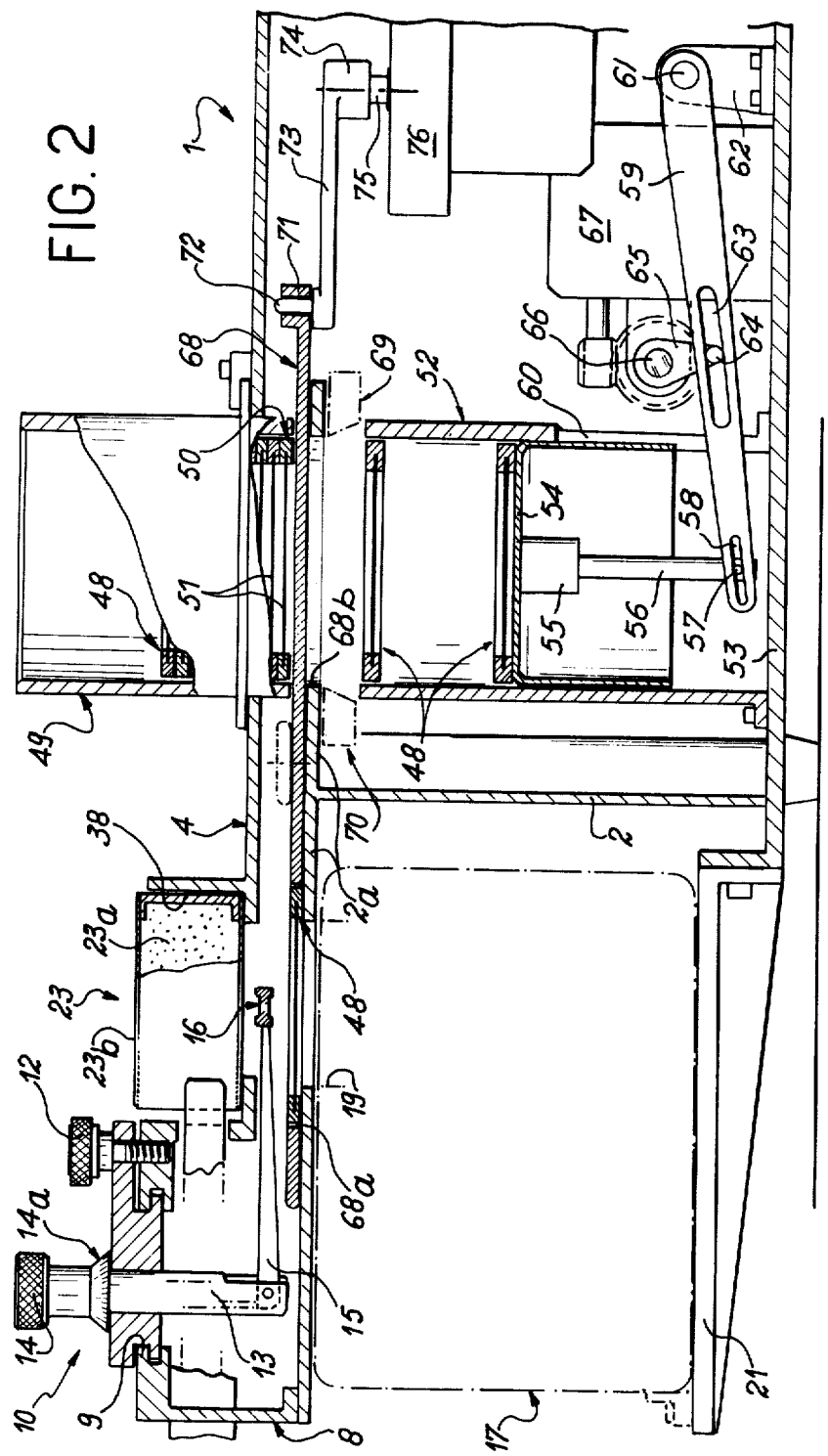
FIG. 2 is a sectional view to a larger scale which illustrates said device and shows more especially the constructional detail of the mechanisms of the filter-transfer unit.

As shown in FIG. 1, the device which is generally designated by the reference 1 is mainly composed of a metallic casing 2 provided with lateral handles 3 for transporting the apparatus and positioning this latter within a suitable inspection station. The casing 2 is provided in the top portion thereof with a horizontal table 4 delimited by raised flanges such as those designated by the reference numerals 5 and 6. Said flanges serve in particular to guide the samples 23 to be analyzed, these samples being grouped together after inspection in a storage zone 7 provided at the end of the apparatus on the table 4. Said samples can in particular be presented (as shown in FIG. 2) in the form of pellets of compacted powders 23a surrounded by a thin jacket 23b of plastic material so as to give the complete assembly the shape of a relatively flat cylindrical disc and all the samples to be inspected have the same volume and the same geometry. In the example described, said samples are constituted by substances derived from sampling operations carried out on ocean beds, the object of the analysis being to determine the composition and content of said samples. It is clearly apparent that the characteristics of the apparatus under consideration are independent of the nature of the samples on condition that these latter are all identical both in presentation and overall size.

Inspection of samples is carried out in accordance with the known method of non-dispersive X-ray fluorescence. To this end, the apparatus comprises a measuring head 8 shown diagrammatically in the perspective view of FIG. 1 and comprising a slot 9 which permits the engagement of a source-holder 10. Said source-holder comprises a lateral flat member 11 forming a slide-arm which is intended to engage within the slot 9 and to be locked in a suitable position with respect to the casing of the head 8 by means of a lock-screw 12. The slide-arm 11 also has a vertical support 13 fitted with a knurled knob 14 with a height-adjustment vernier 14a; said support 13 has an extension at the lower end thereof in the form of a transverse supporting-arm 15 at the end of which is carried a sealed radioactive source 16. By mounting the source-holder assembly 10 within the measuring head 8, it is possible to place the source 16 beneath the table 4 of the casing 2 in a precisely determined position in which said source is substantially centered beneath a sample 23 to be inspected which has previously been brought into this position as illustrated in the sectional view of FIG. 2. The X-radiation re-emitted by the sample 23 under the action of the radiation emanating from the source 16 is received by a removable detector 17 provided with carrying handles 18, said detector being provided with an entrance window 19 through which said X-radiation penetrates. There is shown at 20 in FIG. 1 the electrical connecting terminal for the supply of current to the detector and the signal-delivery output. Finally there are shown at 21 guides which ensure suitable positioning of said detector beneath the table 4 against the casing 2.

In accordance with the invention, the apparatus under consideration comprises an automatic and sequential sample-transfer unit 22, the constructional detail of which also appears in the perspective view of FIG. 1. Said transfer unit 22 essentially comprises an inclined plane 22a for the different samples 23 to be inspected within the apparatus, said inclined plane 22a being divided in the example described into four parallel slide-ramps separated by lateral partition-strips 24. The samples 23 are placed one after the other within each ramp and subjected to the action of gravity which causes them to slide along the ramps while being guided by lateral partition-strips whilst a top holding strip 26 maintains the samples within the ramps. There is formed in said holding strip an axial groove 26 in which is engaged a stud 28 carried by a weight 29 mounted within each slide-ramp in succession on the different samples. At the bottom ends of the different slide-ramps of the transfer rack 22, the samples 23 are locked in position by means of retractable lugs which are so designed as to be actuated in synchronism; to this end, said lugs are coupled together by means of a cross-bar (not shown) which is located beneath the transfer rack. Said cross-bar is in turn attached to a spring blade 31 which is fixed by means of screws 32 against the side of the transfer rack and actuated by an electromagnetic 33 so as to attract the blade 31 and to withdraw the lugs 30 from the base plane of the slide-ramps. The first four samples which are in position within said slide-ramps at the lower ends of said ramps accordingly slide off these latter and then drop beyond the edge 37 of the transfer rack onto the table 4 of the casing 2, thus holding the four following samples in position until the lugs 30 return to their projecting positions. The transfer rack 22 is also provided with a manual control box 34 which is mounted on one side of the rack outside the slide-ramps and carries operating keys 34a. Said keys serve to initiate the different functions of the apparatus and in particular the synchronized and automatic operation of the sample-transfer unit and the filter-transfer unit, or alternatively the non-continuous operation of these latter, the resetting of the different mechanisms at the end of cycles and so forth. The electrical lead wires from the keys 34a are connected by a cable 35 passed through the casing 2 to an electronic cubicle 36 for general control and counting which also receives the data derived from the detector 17.

The control and counting cubicle 36 aforesaid is of wholly conventional design and further comprises a high-voltage supply, a linear amplifier for the pulses delivered by the measuring head, a pulse-amplitude selector, a remote-control module, two pulse-counting scalers, one of which counts the pulses which are delivered from the detector after amplification and selection whilst the other scaler counts the filters employed from the beginning of inspection of a given sample, a quartz clock, a preselection programmer for determining the duration of each counting operation and a recorder control frame for printing the results. A control cubicle of this type has no direct bearing on the invention and its construction does not present any special difficulty for any one versed in the art, taking into account the level of technical knowledge which has been attained in this field at the present time. By way of alternative, it would be possible in particular to employ a computing unit for the control of the different functions of the apparatus in order to process the data directly for immediate utilization of the results of measurements.

The four samples 23 which slide from the bottom edge 37 of the transfer unit 22 are collected in a trough 38 which is formed between said edge and the flat strip 6 of the table 4, then displaced towards the measuring head 8 by means of a heel-piece 39 which forms a push-plate and is fixed on the end of a flat actuating-bar 40 which is capable of moving within a slit 41 formed in the trough 38. Said actuating-bar 40 is rigidly fixed by means of screws 42 to a transverse guide rule 43 mounted within the interior of the box 2 beneath the table, said guide rule being provided at the top end thereof with a rack 44 in meshing engagement with a pinion 45 which is keyed on the shaft end of a first drive motor 46. Provision is made on the rule 43 for suitably spaced projecting studs 47 which are capable of actuating microswitches (not shown in the drawings) at predetermined time intervals in order to enable each sample 23 of the trough 38 to move into position exactly in front of the measuring head 8 and to remain stationary in this position for the necessary period of time to undergo the desired analyses before another forward movement of the guide rule 43 causes a further displacement of the heelpiece 39 so as to thrust the samples into the trough. The sample which has already been analyzed is then placed on the storage platform 7 in order to leave room for another sample in front of the measuring head where the cycle starts again. In this cycle, the re-emitted X-radiation of each sample 23 which has been subjected to the radiation emanating from the source 16 is applied to the window 19 of the detector 17 through a filter 48 having predetermined characteristics. The number of analyses performed corresponds to the number of different filters to be brought successively into the space of small thickness which is provided between the source 16 and the window 19. This automatic changing of filters is carried out by means of an independent filter-transfer unit, the constructional design of which is illustrated in greater detail in FIGS. 2 and 3.

The filters 48 ar stacked prior to use within a tubular shaft 49 placed above the table 41 and are each composed of an external annular collar 50 surrounding a central portion 51 which constitutes the filter proper. Beneath the tubular shaft 49, a well 52 fixed against the base 53 of the casing 2 receives the filters one by one after use. At the bottom of the well 52, the filters 48 are supported by a piston 54 fitted internally with a head 55 having an extension in the form of an axial rod 56 which carries a cross-pin 57. Said cross-pin cooperates with an elongated slot 58 formed at the end of a lever 59 which, after passing through a slit 60 formed in the lateral wall of the well 52, is pivotally mounted at 61 on a support bracket 62 which is fixed against the base 53 of the casing 2. The lever 59 has a second elongated slot 63 in which is engaged a crank-pin 64 fixed on the end of a crank-arm 65. This latter is axially coupled to the output shaft 66 of a second electric drive motor 67. By virtue of the crank arm and pin system thus provided, the rotation of the motor which drives the crank-arm 67 transforms said movement of rotation into a movement of oscillation of the lever 59 which forms a connecting-rod; this movement of oscillation is transmitted to the piston 54 which supports the filters 48 within the well 52. On completion of a cycle and after utilization of the assembly or of a certain preselected number of filters 48 of the stack contained in the tubular shaft 49 in the manner which will be explained in greater detail hereinafter, said piston 54 returns said filters upwards within the well in a continuous movement, the amplitude of which determines the complete return to the initial position of the stack of filters.

Figure 3:
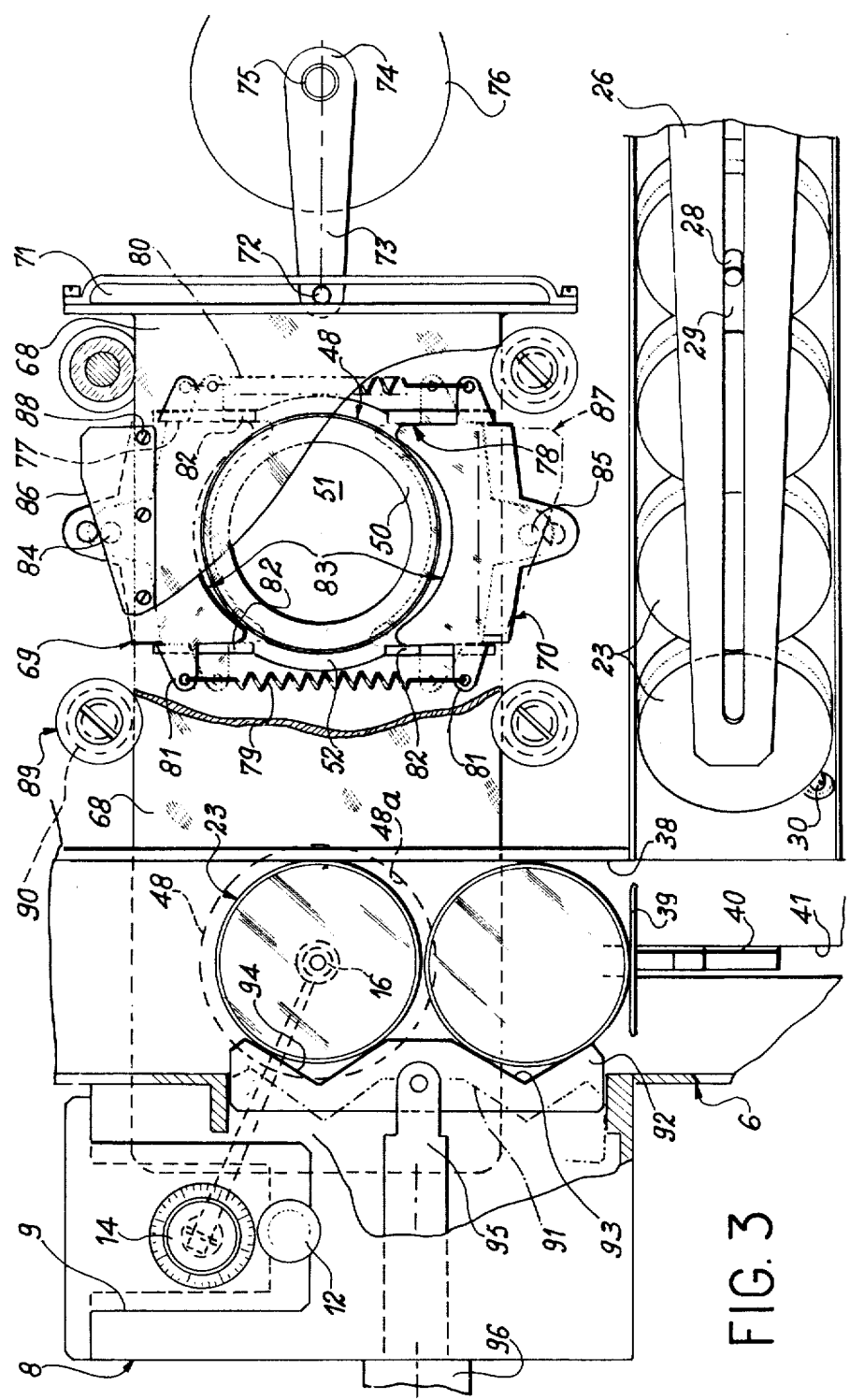
FIG. 3 is a top view in partial cross-section showing the filter-transfer unit according to FIG. 2.

In order to carry out the transfer of the filters 48 in unitary sequence from the stack contained in the tubular shaft 49 to the position in which there are actually utilized for measurements between the source 16 and the window 19 of the detector 17, and finally in order to return said filters above the well 52 and release them onto the support piston 54 within said well, the apparatus comprises an automatic conveyor system designed in the form of an elongated rectangular plate 68 provided at one end with an opening 68a, the dimensions of which correspond exactly to those of a filter 48. Said plate 69 slides continuously along a flange 2a of the casing 2 which projects both towards the exterior and towards the interior of the casing, while at the same time being guided in its movement by grooved pulleys 89 carried by lateral columns 90 (as shown in FIGS. 3 and 5). Any filter 48 placed within the opening 68a of the plate 68 can thus be transferred in a transverse movement of displacement from a first position in which said filter is still in the stack of filters between the tubular shaft 49 and the well 52 to a second position in which the same filter is located beneath the source 16 opposite to the sample 23 to be inspected. In order to ensure in addition that, in the first position, the stack of filters located within the tubular shaft 49 is prevented from passing freely through the opening 68a and being directly applied against the piston 54, the apparatus comprises two rectractable stopping jaws 69 and 70, the constructional design of which will be described in detail hereinafter and which prevent any non-programmed dropping of said filters by being interposed beneath the plate 68 of the conveyor system (shown in FIG. 4). When any one filter 48 which is displaced by the plate 68 moves back after use, said filter passes out of the opening 68a so as to engage within an opening 68b having the same dimensions and provided in the flange 2a of the casing 2, the filter being locked in this position by the jaws 69 and 70 which have been moved closer together. At the same time, another filter 48 of the stack which is contained in the tubular shaft 49 comes into position within the opening 68a and said filter is accordingly ready to be displaced by the plate 68 onto the measuring head. The apparatus comprises means which serve to actuate the jaws 69 and 70 and are put into operation at the front end of said plate so as to release the first filter into the well 52, the stack of the filter being then stopped by the rear portion of the plate 68 aforesaid (as shown in FIGS. 4 and 5).

In order to carry out the alternating displacement of the conveyor system between the two positions mentioned earlier, the plate 68 is provided at the end opposite to the opening 68a with a cross-bar 71 (shown in FIG. 3). Said cross-bar delimits with the corresponding parallel edge of the conveyor a slot in which is engaged a stud 72 mounted at the extremity of a lever 73 (as shown in FIG. 2). Said lever terminates in a sleeve 74 in which is engaged the shaft 75 of a third drive motor 76. This mechanism which also constitutes a device of the crank arm and pin type converts the movement of rotation of the motor 76 into a reciprocating movement of displacement of the plate 68 of the conveyor. Said plate is thus permitted to take each filter 48 from the stack, to bring it into the inspection position beneath the sample 23, then to return it to the rear and finally to allow said filter to escape from the flange 2a into the opening 68b in which it is retained by the jaws 69 and 70 while a fresh filter is taken at the same time.

Figure 4:
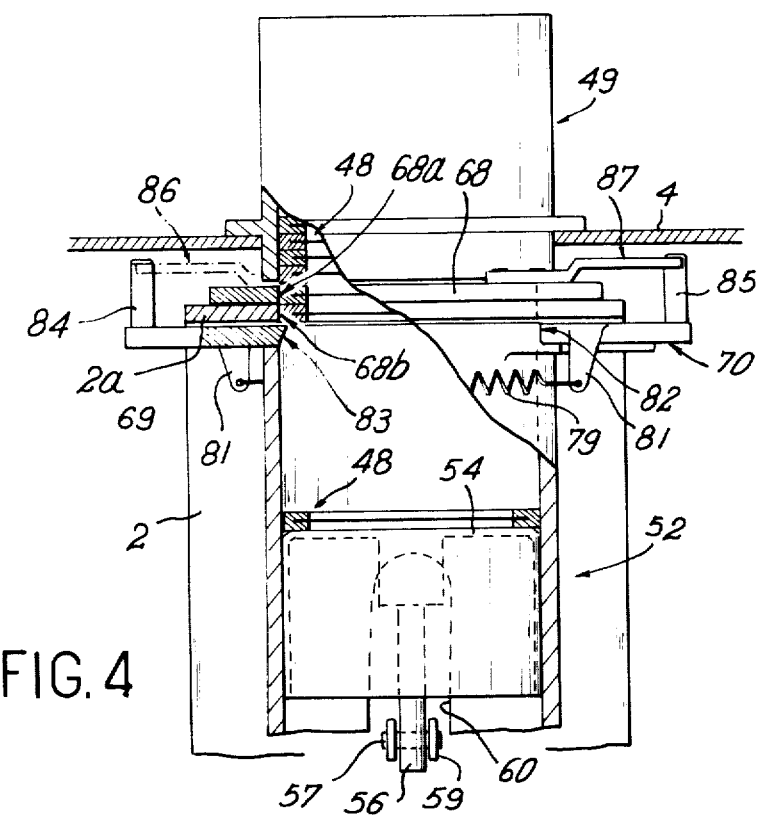
FIGS. 4 and 5 are detail views of the filter-transfer unit according to FIGS. 2 and 3.
Figure 5:
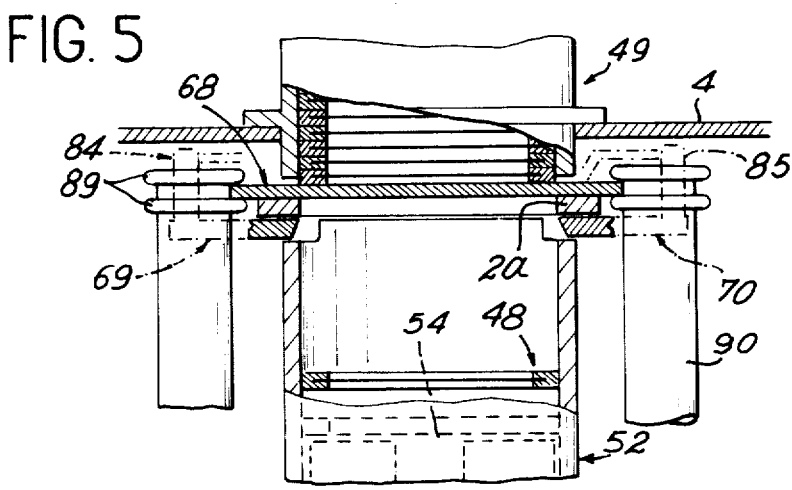

The top view of FIG. 3 as well as the partial view of FIG. 4 make it easier to understand the practical construction of the jaws 69 and 70 which are associated with the conveyor. In the example considered, said two jaws are designed in the form of two noses guided within lateral slideways 77 and 78 formed beneath the plate 68, said jaws being normally urged towards each other under the action of springs 79 and 80 attached to lateral lugs 81 in such a manner as to bear against stops 82. In those faces which are directed towards each other, the jaws 69 and 79 are hollowed-out so as to have a circular profile 83 which is capable of conforming substantially to the shape of the annular collars 50 of the filters 48 in order to support these latter when said jaws are moved towards each other, that is to say applied against their stops 82, without hindering the release of said filters when the jaws are in the outwardly displaced position. For the purpose of initiating their opening movement, the jaws are provided in particular with two studs 84 and 85 located on the side opposite to the curved profile 83 of the jaws, said studs being capable of cooperating with two wedge-shaped members 86 and 87 which are fixed by means of screws 88 against the conveyor plate 68 in the rear portion of this latter, namely at the end remote from the opening 68a. When the plate 68 carries out a movement of displacement to the left of the drawing in FIG. 3, that is to say when the filter 48 which is engaged in said opening 68a comes into position beneath the source 16 of the measuring head, the wedge-shaped members 86 and 87 come progressively into contact with the studs 84 and 85 and exert on these latter a separating force which is transmitted to the jaws 69 and 70. The filter 48 which has been released by the conveyor at the end of the previous back-and-forth movement as explained earlier, namely the filter which is present on the plate 68 within the opening 68b of the flange 2a, is then released and falls freely into the well 52. The diametral dimensions of the well 52 are advantageously chosen so as to be slightly larger than those of the filters 48 in order to ensure that the fall of each filter inside the well is damped by the air cushion formed between said filter and the piston 54 which is located at the bottom of the well, thereby preventing any damage to said filter.

In an alternative form of construction, provision could also be made for a system driven by the motor 67 and adapted to produce action on the position of the lever 59 and consequently of the supporting piston 54 in such a manner as to cause a downward displacement of said piston within the well 52 with successive amplitudes which correspond each time to the thickness of one filter, the return of the filters after either a part or the whole of the stack has been used being carried out as in the design solution which has been more especially described. In all cases, as soon as the movement of the plate 68 is reversed, the wedge-shaped members 86 and 87 move away from the studs 84 and 85, the jaws are again applied against their stops 82 under the action of the springs 75 and 80 in a position in which they are capable of stopping the fall of the filter which has just been used and the stack of filters of the tubular shaft 49 through the openings 68a and 68b.

The equipment of the apparatus is finally completed by means of an additional mechanism which is advantageously adapted to the measuring head 8 and serves to lock the samples 23 in a suitable position as these latter are transferred. This mechanism which is generally designated by the reference 91 is mainly composed of a cross-member 92 having two successive recesses 93 and 94 which are capable of coming into position so as to immobilize two adjacent samples 23, one of which is in the position of analysis opposite to the source 16 and the window 19 of the detector 17 whilst the second is in the stand-by position and maintained stationary with respect to the first in order to ensure that said second sample is not liable to slide on the table 4 of the casing as a result of faulty inclination of said table, for example, thus preventing the automatic operation of the apparatus. To this end, the cross-member 92 is carried by a rod 95 which is subjected to the attraction of an electromagnet 96 and to the action of an oppositely-acting spring (not shown) which makes it possible according to the displacement of the cross-member either to release the samples 23 as these latter advance or to lock them in position at the time of the measurements proper.

The operation of the continuous-analysis device which is thus constituted can readily be deduced from the foregoing: when a series of four samples supplied from the transfer rack 22 has been brought into the trough 38, the push-plate 39 which is driven by the motor 56 by means of the guide rule 43 moves said samples into position one after the other in front of the measuring head 8 where each sample is locked in detector in turn by the cross-member 92 during the period of time which is necessary for analyses. In the case of a given sample which has thus been placed opposite to the radioactive source 16, either the entire number or a preselected number of filters 48 contained within the tubular shaft should in fact be transferred beneath said source within the space of small thickness which is formed between said source and the window 19 of the detector 17. To this end and without making any change in the position of the sample 23 which remains immobilized, the filters 48 are taken one after the other by the plate 68 of the conveyor and by the mechanism which is actuated by the motor 76, are brought beneath the sample 23 and remain in this position during the time which is necessary for measurements. On completion of these measurements, the backward return of the conveyor has the effect of withdrawing the filter, then causing it to escape from the opening 68a into the opening 68b. At the same time, a fresh filter takes the place of the preceding and finally causes it to fall into the well 52 as a result of the separation of the jaws 69 and 70 at the time of the following displacement of the conveyor. At the end of an operation, a preselected number or all the filters of the stack are again present on the piston 54 inside the well 52; the motor 67 then moves said filters upwards within the tubular shaft 49 and, as it passes through, the stack of filters opens the jaws 69 and 70 which are held open during this final stage of return of the filter-transfer unit to the initial position. The push-plate 39 then advances a fresh sample 23 which displaces the previous sample; the filter-transfer cycle starts again and so forth until all the samples have been examined.

It is readily apparent that all the electrical data which are necessary for the satisfactory performance of the operations described in the foregoing are centralized within the cubicle 36, provision being made for the lock-outs which are essential for ensuring that each stage of the cycle takes place only when the preceding stage has been completed, any fault condition or defective operation being such as to initiate stopping of the apparatus and to trigger an alarm system for warning an operator.

In consequence of the foregoing and especially by reason of its fully automatic operation, the device in accordance with the invention offers numerous advantages, in particular by virtue of the fact that a large number of filters of the order of 50, for example, can be employed without requiring any manual intervention in an apparatus of relatively small overall size which can readily be transported. Said device also makes it possible to control automatically the beginning and end of each counting operation of the detector after positioning of each filter and prior to replacement of this latter. Finally, the device permits automatic positioning and inspection of successive samples by means of the same series of filters which are presented each time in the same order. The necessary operations can easily be programmed by the electronic control unit which ensures a connection between this latter and the counting assembly. Finally, the filters and the samples can be coded by means of a suitable numeral or reference, thereby permitting simple control of the results obtained and their preselected number by means of any counting system and especially by indication on an electromagnetic bidirectional counter.

As has already been stated, the method of analysis employed by means of the apparatus considered has little bearing on the design concept of this latter and can only have an influence on the structure and utilization of the measuring head. The invention would therefore apply to many alternative types of portable units which carry out sequential positioning of flat elements within a small space by withdrawal from a stack, positioning by translational motion and reintegration in the stack which is stored for subsequent presentation in the same order. Similarly, the transfer unit can be provided with a supply so as to subject the measuring head to thermostatic control.

What we claim is:

1. A device for the continuous analysis of samples especially by non-dispersive x-ray fluorescence analysis, comprising a measuring head constituted by a removable sealed radioactive source and a counting assembly connected to a radiation detector receiving x-radiation re-emitted by the sample having a plane entrance window which delimits with the source a space of small thickness reserved for the positioning of successive flat filters of identical shape, wherein said device comprises:
   a sequential filter-transfer unit comprising a conveyor driven in reciprocating motion between a first position in which a filter is brought into the space formed between the source and the detector and a second position in which the filter aforesaid is integrated in a stack formed by all the filters,
   a sample-transfer unit comprising an inclined transfer rack provided with parallel slide-ramps containing the samples to be analyzed, a trough for receiving groups of samples formed by one sample from each slide-ramp, a push-plate for the group of samples within the trough, the function of said push-plate being to cause said samples to pass in unitary sequence in front of the measuring head above the source and the space for receiving the filters, and a platform for storing samples after analysis,
   a control assembly for the mechanisms which actuate the filter-transfer unit and the sample-transfer sample-transfer unit and an electronic assembly for recording the signals delivered by the radiation detector after analysis of one sample through each filter.

2. A sample-analysis device according to claim 1, wherein the filter-transfer unit comprises a tubular shaft located above the conveyor and containing the stack of filters, a filter-receiving well located beneath the conveyor in the axis of the tubular shaft and containing a supporting piston, a first crank arm and pin assembly driven by a first electric motor for carrying out the displacement of the piston within the well at the end of a cycle of analysis of a sample by all the filters, the upward motion of the piston from the end of the downward travel thereof for returning the stack of filters into the tubular shaft, a second crank arm and pin assembly driven by a second electric motor so as to cause the reciprocating motion of the conveyor, two movable jaws mounted beneath the conveyor which is provided with an opening for receiving each filter in turn and jaw-separating wedges which are carried by the conveyor and separate said jaws in order to release the filters into the well in unitary sequence after utilization.

3. A sample-analysis device according to claim 2, wherein the supporting piston is driven in a downward movement inside the well with successive amplitudes which each corresponds to the thickness of one filter, then in a reverse movement of upward displacement of the stack of filters with an amplitude which is equal to the total downward travel of said piston.

4. A sample-analysis device according to claim 1, wherein the sample-transfer unit comprises a mechanism for controlling the displacement of the sample push-plate unit which includes a third motor for driving a guide rule attached to the push-plate unit by means of a rack and pinion system, the movement of said rule being such as to correspond to periods of displacement with an amplitude which is equal to the width of one sample separated by stationary periods which correspond to one complete cycle of the filter-transfer unit.

5. A sample-analysis device according to claim 1 wherein the piston for supporting filters within the reception well has head extended by an axial rod carrying a cross-pin in cooperating relation with an elongated slot formed at the end of a lever which constitutes the connecting-rod of the first crank arm and pin assembly.

6. A sample-analysis device according to claim 1 wherein the filter conveyor is constituted by a thin parallelepipedal plate of substantial length provided in the vicinity of one transfer extremity thereof with an opening having dimensions which correspond to those of a filter.

7. A sample-analysis device according to claim 6, wherein the conveyor plate is provided at the end remote from its transfer opening with a cross-bar in parallel relation to the edge of the plate and delimiting a slot in which is engaged an actuating stud mounted at the end of a lever which constitutes the connecting-rod of the second crank arm and pin assembly.

8. A sample-analysis device according to claim 1, wherein the guide rule is provided with studs for actuating microswitches so as to produce action on the circuit of the third motor which controls the displacement of the push-plate unit.

9. A sample-analysis device according to claim 1, wherein the guide rule is rigidly fixed to a flat actuating bar and said bar is capable of displacement within a slot formed in the trough which receives the samples.

10. A sample-analysis device according to claim 1, wherein the samples placed within the slide-ramps of the transfer rack are maintained in position by retractable lugs connected to a spring blade in cooperating relation with an electromagnet which serves to initiate the controlled withdrawal of said lugs.

11. A sample-analysis device according to claim 1, wherein the samples are placed behind each other within each slide-ramp and subjected to the action of a weight which causes said samples to slide within their respective ramps.

12. A sample-analysis device according to claim 1, wherein the samples are immobilized in pairs in front of the measuring head, the first sample being placed opposite to the radioactive source and the second sample which is placed after the first being capable of replacing said second sample after displacement under the action of the push-plate of the sample-transfer unit, the immobilization of said samples being carried out by means of a cross-member having two successive recesses, said cross-member being actuated by an electromagnet.

13. A sample-analysis device according to claim 1, wherein the number of filters and/or samples to be analyzed is preselected.

* * * * *